United States Patent
Ishida et al.

(10) Patent No.: US 7,261,448 B2
(45) Date of Patent: Aug. 28, 2007

(54) VEHICULAR HEADLAMP

(75) Inventors: Hiroyuki Ishida, Shizuoka (JP);
Masashi Tatsukawa, Shizuoka (JP);
Kiyoshi Sazuka, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/976,852

(22) Filed: Nov. 1, 2004

(65) Prior Publication Data

US 2005/0094411 A1    May 5, 2005

(30) Foreign Application Priority Data

Nov. 4, 2003    (JP)    .................... P. 2003-374060

(51) Int. Cl.
*B60Q 1/00*    (2006.01)

(52) U.S. Cl. ............... 362/507; 362/464; 362/523; 362/539; 362/545

(58) Field of Classification Search ............... 362/507, 362/543–5, 460, 523, 525, 228, 427, 464, 362/800, 539, 538
See application file for complete search history.

(56) References Cited

U.S. PATENT DOCUMENTS

| | | | | |
|---|---|---|---|---|
| 4,733,335 | A * | 3/1988 | Serizawa et al. | ............ 362/503 |
| 5,190,368 | A * | 3/1993 | Sekiguchi | .................... 362/539 |
| 5,954,428 | A | 9/1999 | Eichhorn et al. | |
| 6,109,769 | A * | 8/2000 | Lakosky | ..................... 362/459 |
| 6,281,632 | B1 * | 8/2001 | Stam et al. | .................... 315/82 |
| 6,511,215 | B2 * | 1/2003 | Hashigaya | .................. 362/515 |
| 6,540,387 | B2 | 4/2003 | Hashiyama et al. | |
| 6,565,247 | B2 * | 5/2003 | Thominet | .................... 362/545 |
| 6,634,778 | B2 * | 10/2003 | Tatsukawa | ................... 362/523 |
| 6,637,923 | B2 | 10/2003 | Amano | |
| 6,746,143 | B1 | 6/2004 | Van Duyn | |
| 6,857,768 | B2 * | 2/2005 | Watanabe et al. | ........... 362/512 |
| 7,001,054 | B2 | 2/2006 | Koizumi et al. | |
| 7,048,412 | B2 | 5/2006 | Martin et al. | |
| 2004/0202006 | A1 * | 10/2004 | Pien | ........................... 362/545 |

FOREIGN PATENT DOCUMENTS

| | | |
|---|---|---|
| JP | 2000-238576 A | 9/2000 |
| JP | 2001-213227 A | 8/2001 |
| JP | 2003-123517 A | 4/2003 |

OTHER PUBLICATIONS

Korean Office Action and Japanese translation of Korean Office Action.

* cited by examiner

*Primary Examiner*—Renee Luebke
*Assistant Examiner*—Gunyoung T. Lee
(74) *Attorney, Agent, or Firm*—Sughrue Mion, PLLC

(57) ABSTRACT

Whereas a light source bulb is used as a light source of a basic lamp piece unit which needs a large amount of irradiating light, with regard to an additional lamp piece unit lighted on and off repeatedly in accordance with a situation of running a vehicle, a semiconductor light emitting element having a fast response speed in being lighted on and off and excellent in durability against repeatedly lighting on and off the semiconductor light emitting element 64 as a light source thereof. Thereby, light can be irradiated in correspondence with the situation of running the vehicle and life of the light source can sufficiently been ensured. Further, the additional lamp piece unit is made to be able to be compactly constituted to promote a degree of freedom of arranging the additional lamp piece unit.

14 Claims, 11 Drawing Sheets

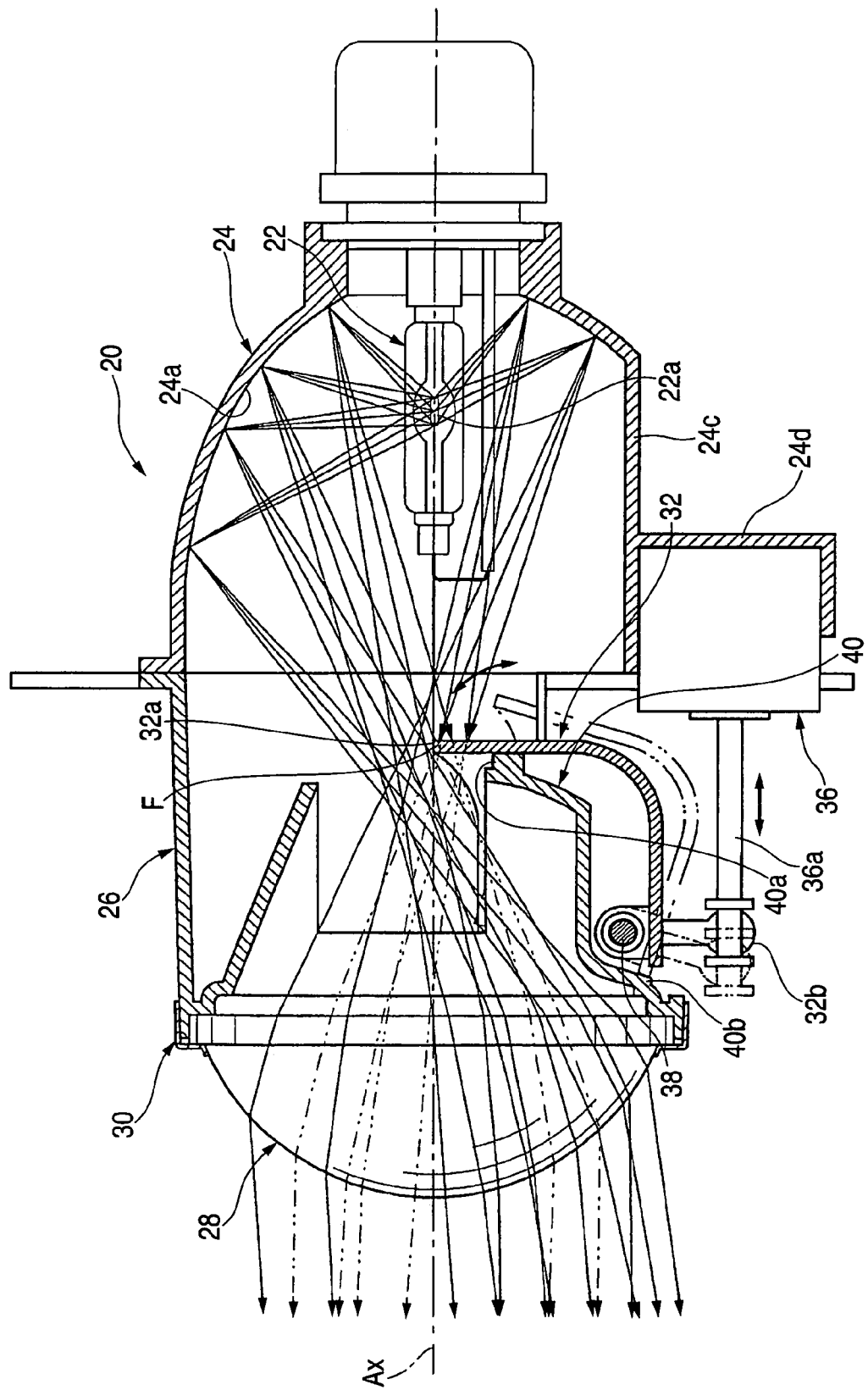

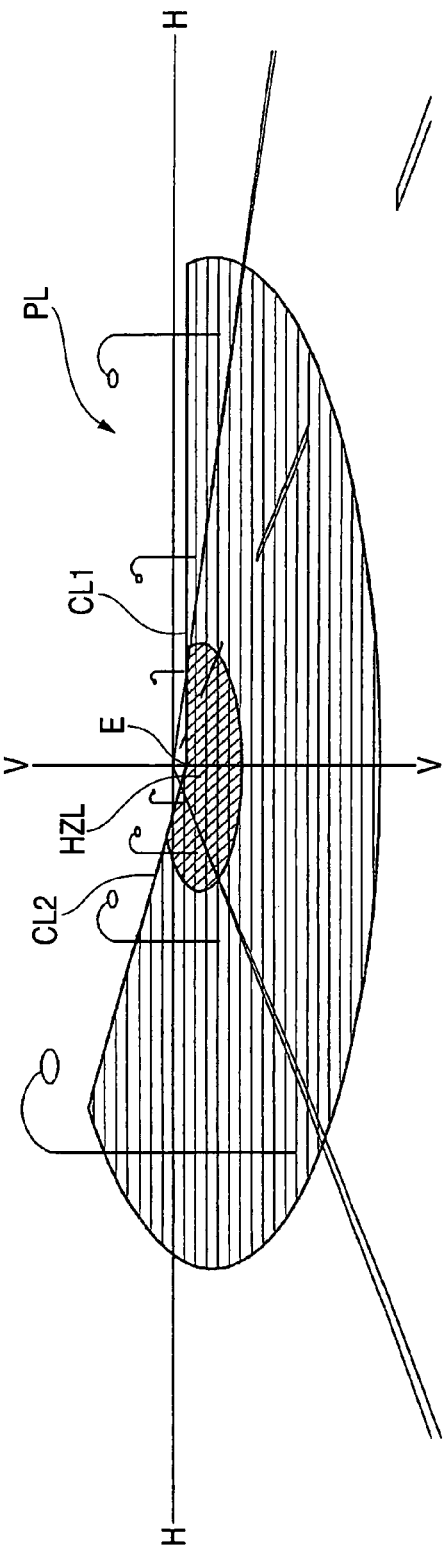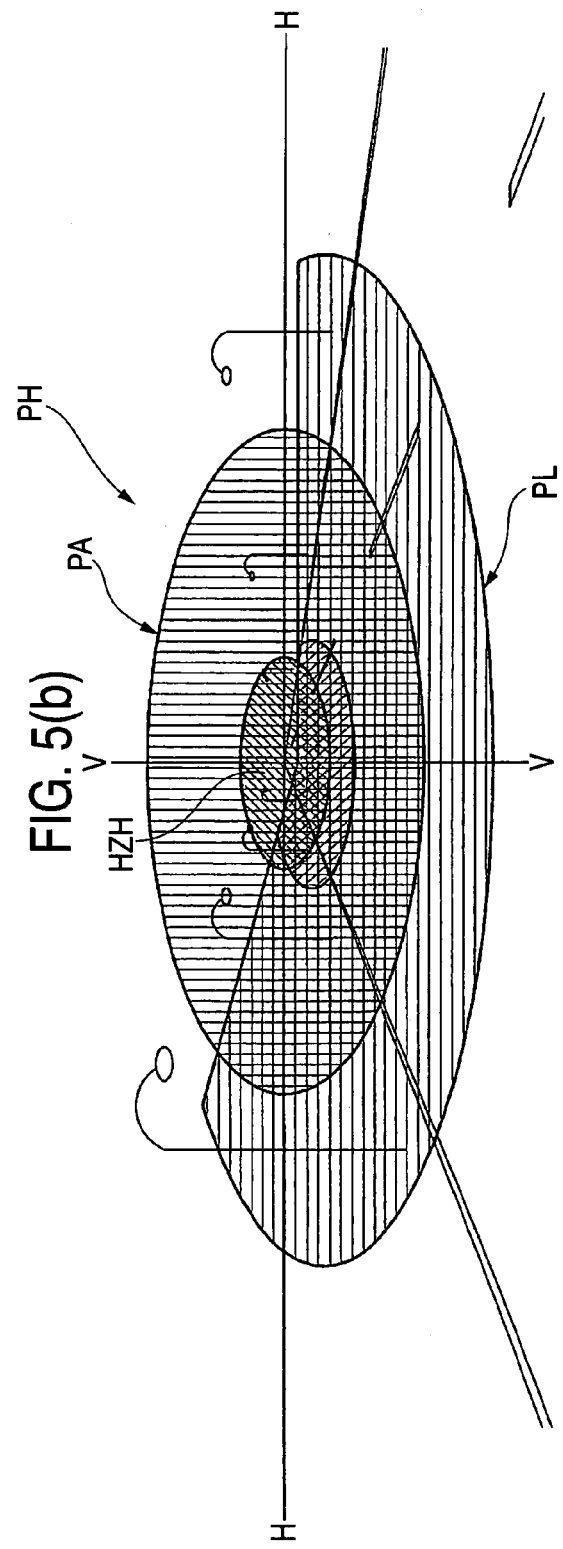

VEHICULAR HEADLAMP

This application claims foreign priority based on Japanese Patent Application no. JP2003-374060, filed on Nov. 4, 2003, the contents of which is incorporated by reference.

BACKGROUND OF THE INVENTION

1. Technical Field

The present invention relates to a vehicular headlamp including a basic lamp piece unit capable of forming a light intensity distribution pattern for a low beam and an additional lamp piece unit capable of being lighted temporarily when lighting the basic lamp piece unit.

2. Background of the Related Art

Generally, a vehicular headlamp forms a light intensity distribution pattern for a low beam having a cutoff line at an upper end edge thereof and is constituted to ensure front optical recognizability of a driver of one's own vehicle, such that glare is not cast to a driver of a vehicle running on an opposite lane or the like.

In this case, as described in, for example, JP-A-2000-238576 or JP-A-2001-213227, a related art vehicular headlamp includes an additional lamp piece unit that irradiates light for forming an additional light intensity distribution pattern by being lighted temporarily in lighting a basic lamp piece unit other than the basic lamp piece unit constituted to be able to irradiate light for forming a light intensity distribution pattern for a low beam.

By including the additional lamp piece unit other than the basic lamp piece unit, sufficient front optical recognizability can be ensured even under a running situation in which the sufficient front optical recognizability is difficult to achieve by a normal light intensity distribution pattern for a low beam. For example, when the additional lamp piece unit is provided to form the additional light intensity distribution pattern in a side direction of the light intensity distribution pattern for a low beam and the additional lamp piece unit is additionally lighted in running the vehicle to turn, a front road face in a turning direction can sufficiently be irradiated.

However, according to the vehicular headlamp described in the above-cited related art, a light source bulb of a discharge bulb, a halogen bulb or the like is used not only for the basic lamp piece unit but also for the additional lamp piece unit as light sources thereof. Therefore, at least the following problem is posed.

Although the additional lamp piece unit is lighted on and off repeatedly in accordance with the situation of running the vehicle, there is a related art problem in that a response speed of the light source bulb in lighting on and off the light source bulb is not so fast. Therefore, there is a related art problem in that the light source bulb is not sufficient in irradiating light in correspondence with the situation of running the vehicle.

Further, there is a related art problem in that by frequently repeating to light on and off the light source bulb, life of the light source bulb is shortened.

Additionally, when the light source bulb is used in the related art, there also is a problem in that a size of the additional lamp piece unit is enlarged to some degree. Therefore, it is not easy to arrange the additional lamp piece unit to form the aimed additional light intensity distribution pattern.

SUMMARY OF THE INVENTION

The invention has been carried out in view of such a situation. It is an object thereof to provide a vehicular headlamp constituted by including a basic lamp piece unit capable of forming a light intensity distribution pattern for a low beam and an additional lamp piece unit capable of being lighted temporarily in lighting the basic lamp piece unit, in which a degree of freedom of arranging the additional lamp piece unit is promoted and the vehicular headlamp can irradiate light in correspondence with a situation of running a vehicle after sufficiently ensuring life of a light source thereof.

However, the present invention need not achieve this object or any disclosed object, and other objects may be achieved. Alternatively, no objects may be achieved without affecting the scope of the invention.

The invention devises the constitution of the light source of the additional lamp piece unit.

That is, the vehicular headlamp according to the invention is characterized in a vehicular headlamp including a basic lamp piece unit constituted to be able to irradiate light for forming a light intensity distribution pattern for a low beam, and an additional lamp piece unit constituted to be able to irradiate light for forming an additional light intensity distribution pattern by being lighted temporarily in lighting the basic lamp piece unit, wherein a light source bulb is used as a light source of the basic lamp piece unit and a semiconductor light emitting element is used as a light source of the additional lamp piece unit.

A specific constitution of the "basic lamp piece unit" is not particularly limited so far as the light source is constituted by the light source bulb. Further, although the "basic lamp piece unit" may be constituted to irradiate light only for forming the light intensity distribution pattern for a low beam, the "basic lamp piece unit" may be constituted to be able to selectively irradiate light for forming the light intensity distribution pattern for a low beam and irradiate light for forming a light intensity distribution pattern for a high beam.

A kind of the "light source bulb" is not particularly limited but, for example, a discharge bulb, a halogen bulb or a normal incandescent bulb can be adopted.

A specific constitution of the "additional lamp piece unit" is not particularly limited so far as the light source is constituted by the semiconductor light emitting element. Further, it is not particularly limited at what timing the "additional lamp piece unit" is temporarily lighted. Further, a shape, a size, a light intensity distribution, a position of forming or the like of the "additional light intensity distribution pattern" formed by the "additional lamp piece unit" is not particularly limited.

A kind of the "semiconductor light emitting element" is not particularly limited but, for example, a light emitting diode, a laser diode or the like can be adopted.

As shown by the above-described constitution, the vehicular headlamp according to the invention includes the basic lamp piece unit constituted to be able to irradiate light for forming the light intensity distribution pattern for a low beam and the additional lamp piece unit constituted to be able to irradiate light for forming the additional light intensity distribution pattern by being lighted temporarily in lighting the basic lamp piece unit, the light source bulb is used as the light source of the basic lamp piece unit, the semiconductor light emitting element is used as the light source of the additional lamp piece unit and therefore, the following operation and effect can be achieved.

With regard to the basic lamp piece unit that needs a large amount of irradiating light, a necessary number of pieces of the lamp piece units can be minimized by using the light source valve as the light source. On the other hand, with regard to the additional lamp piece unit lighted on and off repeatedly in accordance with the situation of running the vehicle, by using the semiconductor light emitting element having a fast response speed in lighting on and off the semiconductor light emitting element and excellent in durability against lighting on and off the semiconductor light emitting element repeatedly as the light source, light can be irradiated in correspondence with the situation of running the vehicle.

Further, life of the light source can sufficiently be ensured. By using the semiconductor light emitting element, the additional lamp piece unit can compactly be constituted. Therefore, the additional lamp piece unit can easily be arranged to be able to form the aimed additional light intensity distribution pattern.

In this way, according to the invention, in the vehicular headlamp including the basic lamp piece unit capable of forming the light intensity distribution pattern for a low beam and the additional lamp piece unit capable of being lighted temporarily in lighting the basic lamp piece unit, light can be irradiated in correspondence with the situation of running the vehicle after promoting a degree of freedom of arranging the additional lamp piece unit and sufficiently ensuring life of the light source.

In the above-described constitution, when a discharge bulb is used as the light source bulb of the basic lamp piece unit, the following operation and effect can be achieved.

Color temperature of light emitted by the discharge bulb is considerably higher than that of a halogen lamp or the like and is near to color temperature of light emitted by the semiconductor light emitting element. By using the discharge bulb as the light source bulb of the basic lamp piece unit, pale irradiated light from the additional lamp piece unit can be added to pale irradiated light of the basic lamp piece unit. Thereby, a strange feeling can be prevented from being given to a driver when the additional lamp piece unit is lighted on and off.

Further, when the basic lamp piece unit and the additional lamp piece unit are simultaneously lighted, a feeling of unity of color can be provided to the two lamp piece units. Therefore, an outlook of the lamp pieces can be prevented from being deteriorated.

Further, in the above-described constitution, when the additional lamp piece unit is arranged to direct to an outer side in a vehicle width direction by an angle relative to a front and rear direction of the vehicle, the additional light intensity distribution pattern can easily be formed in the side direction of the light intensity distribution pattern for a low beam and therefore, when the additional lamp piece unit is additionally lighted in running the vehicle to turn, a front road face in the turning direction can sufficiently be irradiated to promote optical recognizability thereof.

In this case, although a specific value of the "angle" is not particularly limited, it is preferable to set the "angle" to a value of about 15 through 60° from a view point of forming the additional light intensity distribution pattern continuously with the light intensity distribution pattern for a low beam.

Further, generally, a pair of the vehicular headlamps are provided on two left and right sides of a front end portion of the vehicle and therefore, when the two lamp pieces are constituted in this way, whereas the additional lamp piece unit on the right side is additionally lighted in running the vehicle to turn to the right, the additional lamp piece unit on the left side is additionally lighted in running the vehicle to turn to the left, even in the case of turning the vehicle in either direction, the front road face in the turning direction can sufficiently be irradiated to promote the recognizability.

In the above described constitution, when there is constructed a constitution of providing light controlling means for increasing or reducing an amount of irradiating light of the additional lamp piece unit in accordance with the situation of running the vehicle, the light can further finely be irradiated in correspondence with the situation of running the vehicle.

Further, in the above-described constitution, when there is constructed a constitution of providing swiveling means for inclining the additional lamp piece unit in a left and right direction in accordance with the situation of running the vehicle, the front road face in the turning direction can further precisely be irradiated in running the vehicle to turn. At this occasion, since the additional lamp piece unit can compactly be constituted as described above, the constitution of the swiveling means can be simplified.

Additionally, the present invention includes a vehicular headlamp, comprising a first lamp unit and a second lamp unit. The first lamp unit and the second lamp unit are formed inside a chamber having a cover configured to transmit light, and the light has a substantially similar color, in accordance with the advantages described herein.

BRIEF DESCRIPTION OF THE DRAWINGS

FIG. 4 is a side sectional view showing a single piece of a basic lamp piece unit of the vehicular headlamp according to the exemplary, non-limiting embodiment of the present invention;

FIG. 5(a) is a perspective diagram showing a light intensity distribution pattern for a low beam and FIG. 5(b) is a perspective diagram showing a light intensity distribution pattern for a high beam, both formed on an imaginary vertical screen arranged about 25 m frontward from a lamp piece by light irradiated in a front direction from the basic lamp piece unit;

DETAILED DESCRIPTION OF THE INVENTION

Figure 1:
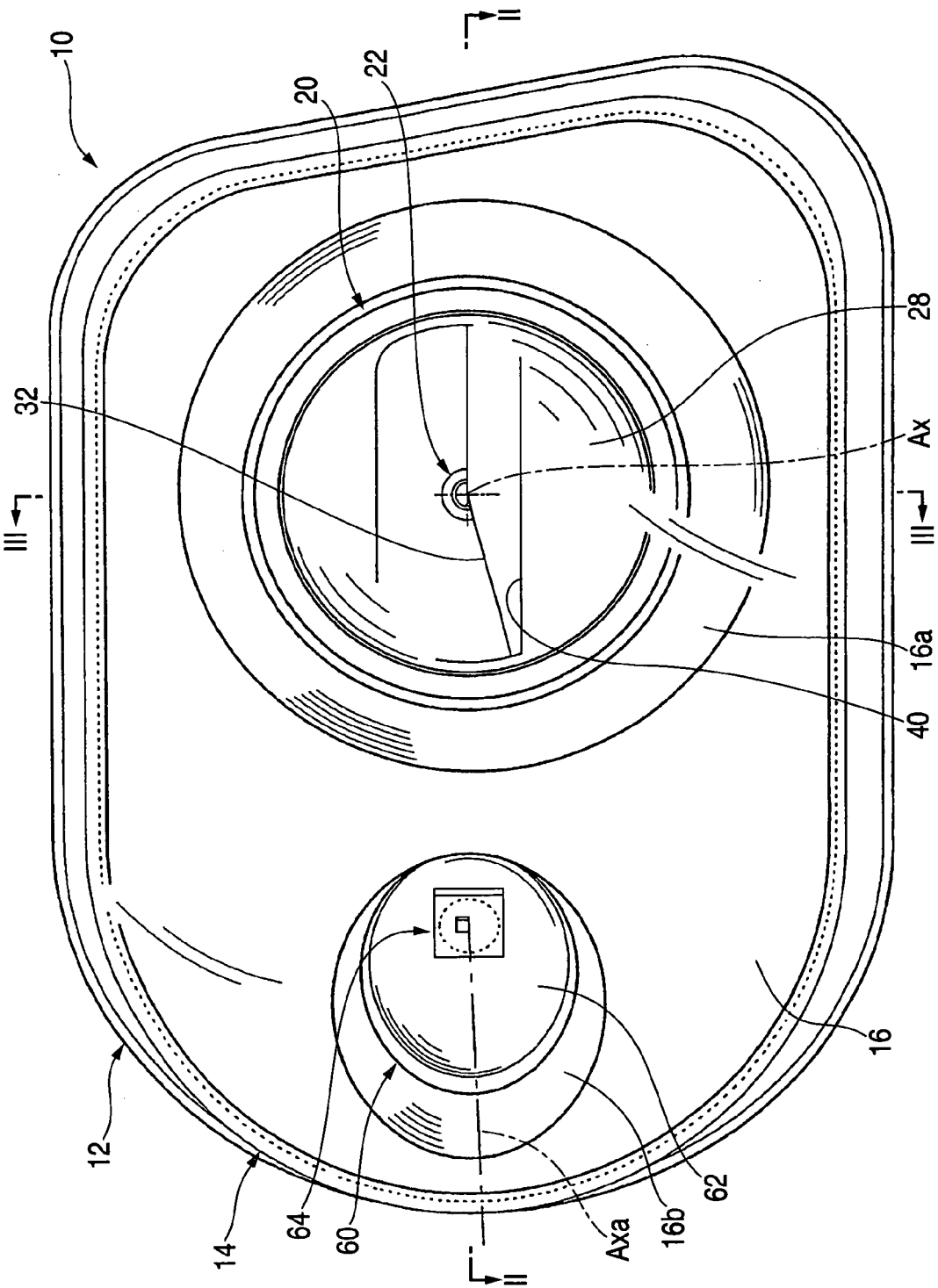
FIG. 1 is a front view showing a vehicular headlamp according to an exemplary, non-limiting embodiment of the present invention.

An embodiment of the invention will be explained in reference to the drawing as follows.

Figure 2:
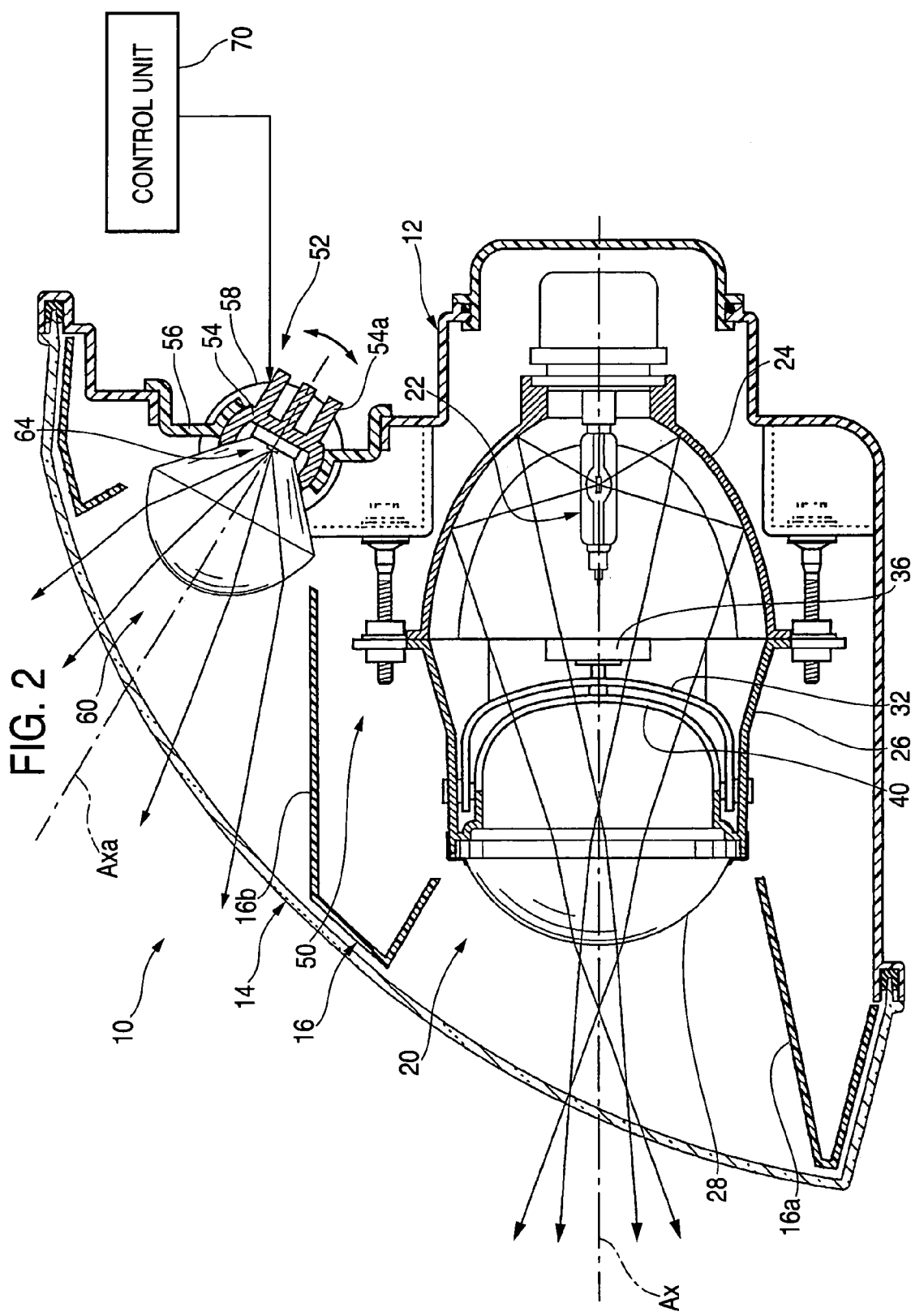
FIG. 2 is a sectional view taken along a line II-II of FIG. 1 according to the exemplary, non-limiting embodiment of the present invention.
Figure 3:
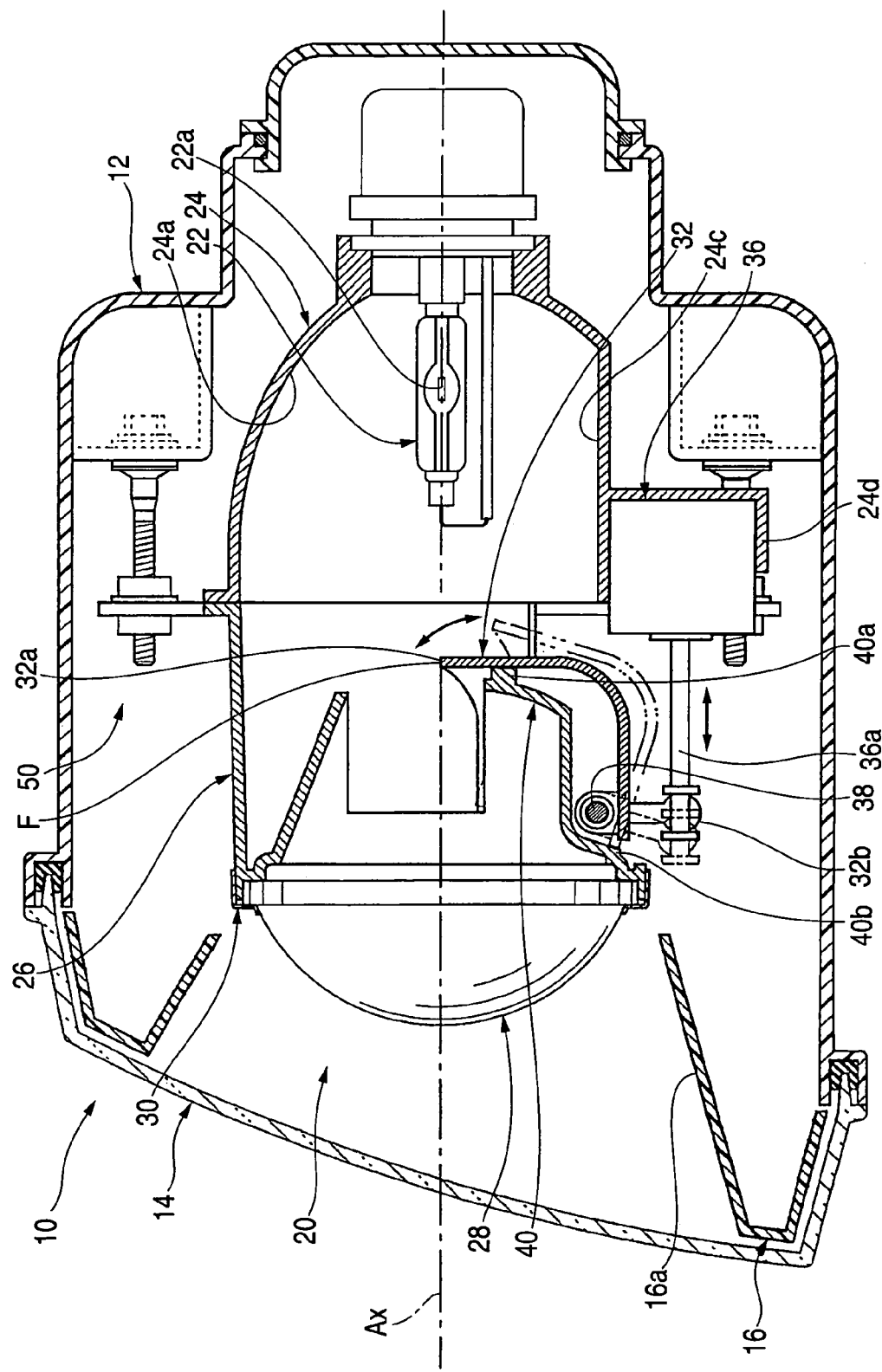
FIG. 3 is a sectional view taken along a line III-III of FIG. 1 according to the exemplary, non-limiting embodiment of the present invention.

FIG. 1 is a front view showing a vehicular headlamp according to an embodiment of the invention, and FIGS. 2 and 3 are a sectional view taken along a line II-II of FIG. 1 and a sectional view taken along a line III-III thereof, respectively.

A vehicular headlamp 10 according to the exemplary, non-limiting embodiment of the present invention is a lamp piece arranged on the right side of a front end portion of a vehicle and constructed by a constitution in which a basic lamp piece unit 20 (e.g., first lamp piece unit) and an additional lamp piece unit 60 (e.g., second lamp piece unit) are inside a lamp chamber formed by a lamp body 12 and a transparent light transmitting cover 14 in a state of being arranged contiguously to the left and right.

Further, inside the lamp chamber is an inner panel 16 along the light transmitting cover 14. Cylindrical opening portions 16a, 16b surrounding the basic lamp piece unit 20 and the additional lamp piece unit 60 are respectively formed at positions of the inner panel 16 in correspondence with the basic lamp piece unit 20 and the additional lamp piece unit 60.

The basic lamp piece unit 20 is constituted to be able to switch a beam between a low beam and a high beam position. In a low beam mode, light is irradiated to form a light intensity distribution pattern for the low beam. In a high beam mode, light is irradiated to form a light intensity distribution pattern for the high beam. Meanwhile, the additional lamp piece unit 60 irradiates light for forming an additional light intensity distribution pattern.

Detailed constitutions of the basic lamp piece unit 20 and the additional lamp piece unit 60 are explained below. The basic lamp piece unit 20 is provided with an optical axis Ax extended in a front and rear direction of a vehicle and is supported by the lamp body 12 inclinably in an up and down direction and a left and right direction via an aiming mechanism 50. Further, the basic lamp piece unit 20 is constituted such that the optical axis Ax is extended in a direction downward from the front and rear direction of the vehicle by about 0.5 through 0.6° at a stage of finishing to adjust to aim by the aiming mechanism 50.

FIG. 4 is a side sectional view showing a single piece of the basic lamp piece unit 20. The basic lamp piece unit 20 is a lamp piece unit of a projector type and is provided with a light source bulb 22, a reflector 24, a holder 26, a projecting lens 28, a retaining ring 30, a movable shade 32, and a shade driving actuator 36.

The projecting lens 28 comprises a flat convex lens, a surface on a front side of which is constituted by a convex face, and a face on a rear side of which is constituted by a flat face and arranged on the optical axis Ax to project an image on a focal point face including a rear side focal point F in a front direction as an inverted image.

The light source bulb 22 is a discharge bulb of a metal halide bulb or the like having a discharge light emitting portion 22a, and is attached to the reflector 24 such that the discharge light emitting portion 22a is arranged coaxially with the optical axis Ax on a side rearward from the rear side focal point F of the projecting lens 28.

The reflector 24 is constituted to reflect light from the discharge light emitting portion 22a to direct in the front direction to be proximate to the optical axis Ax. A sectional shape of a reflecting face 24a of the reflector 24 including the optical axis Ax is substantially set to an elliptical shape and is set such that eccentricity thereof is gradually increased from a vertical section to a horizontal section. Further, light from the discharge light emitting portion 22a reflected by the reflecting face 24a is converged substantially to a position in the vertical section slightly frontward from the rear side focal point F and in the horizontal section, the converged position is moved considerably in the front direction.

The holder 26 is formed to extend substantially in a cylindrical shape from an opening portion of a front end of the reflector 24 in the front direction. The holder 26 fixedly supports the reflector 24 at a rear end portion thereof, and fixedly supports the projecting lens 28 at a front end portion thereof via the retaining ring 30.

The movable shade 32 is disposed substantially at a lower half portion in an inner space of the holder 26 and is pivotably supported by the holder 26 via a pivoting pin 38 extended in the left and right direction. The movable shade 32 can take a light blocking position indicated by bold lines in FIGS. 3 and 4, and a light blocking release position indicated by two-dotted chain lines in the drawings.

On a front side of the movable shade 32, there is formed a fixed shade 40 for preventing astray light reflected by the reflector 24 from being incident on the projecting lens 28 integrally with the holder 26. The fixed shade 40 is formed with a positioning contact portion 40a for fixing the movable shade 32 to the light blocking position by being brought into contact with the movable shade 32 when the movable shade 32 is moved to the light blocking position, and a positioning contact portion 40b for fixing the movable shade 32 to the light blocking release position by being brought into contact with the movable shade 32 when the movable shade 32 is moved to the light blocking release position.

As shown by the bold lines in FIG. 4, an upper end edge 32a of the movable shade 32 is arranged to pass the rear side focal point F of the projecting lens 28 when the movable shade 32 is disposed at the light blocking position. Thereby, a portion of reflected light from the reflector 24 is concealed to remove most of light directed upwardly emitted from the projecting lens 28 in the front direction.

Meanwhile, as shown by the two-dotted chain lines in the drawing, when the movable shade 32 is moved from the light blocking position to the light blocking release position, the upper end edge 32a is displaced in a skewed lower direction to release reflected light from the reflector 24 from being concealed.

A shade driving actuator 36 is constituted by a solenoid or the like having an output shaft 36a extended in the front and rear direction and is fixed to an attaching portion 24d formed at a lower face of a bottom wall 24c of the reflector 24. The output shaft 36a of the shade driving actuator 36 is engaged with a stay 32b formed to project downwardly from the movable shade 32, thereby, reciprocal movement of the output shaft 36a in the front and rear direction is transmitted as pivoting movement of the movable shade 32.

Further, the shade driving actuator 36 moves the output shaft 36a in the front and rear direction by being driven when abeam switching switch (not illustrated for the sake of clarity) is operated to move the movable shade 32 between the light blocking position and the light blocking release position.

FIG. 5 illustrates perspective views of a light intensity distribution pattern formed on an imaginary vertical screen arranged at a position of about 25 m frontward from the lamp piece by light irradiated from the basic lamp piece unit 20 in the front direction. FIG. 5(*a*) shows a light intensity distribution pattern for a low beam and FIG. 5(*b*) shows a light intensity distribution pattern for a high beam.

A low beam light intensity distribution pattern PL is a light intensity distribution pattern for a low beam of a left intensity distribution. An upper end edge thereof includes a horizontal cutoff line CL 1 and a skewed cutoff line CL 2 rising from the horizontal cutoff line CL 1 by an angle (for example but not by way of limitation, about 15°) and a position of an elbow point E which is an intersection of the two cutoff lines CL 1, CL 2 is set to a position downward from H-V which is a vanishing point in a front direction of the lamp piece by about 0.5 through 0.6°. Further, the light intensity distribution pattern PL for a low beam is formed with a hot zone HZL which is a high light intensity region to surround the elbow point E. The light intensity distribution pattern PL for a low beam is formed when the movable shade 32 is disposed at the light blocking position and the horizontal and skewed cutoff lines CL 1, CL 2 are formed as an invertedly projected image of the upper end edge 32*a* of the movable shade 32.

Meanwhile, a light intensity distribution pattern PH for a high beam shown in FIG. 5(*b*) is formed as a light intensity distribution pattern synthesized with the light intensity distribution pattern PL for a low beam and a light intensity distribution pattern PA exclusively for a high beam expanded upwardly from the horizontal and skewed cutoff lines CL 1, CL 2 and includes a hot zone HZH at a vicinity of H-V. The light intensity distribution pattern PH for a high beam is formed when the movable shade 32 is disposed at the light blocking release position and the light intensity distribution pattern PA exclusively for a high beam is formed by reflected light in reflected light from the reflector 24 which is increased by moving the movable shade 32 from the light blocking position to the light blocking release position.

Next, a constitution of the additional lamp piece unit 60 will be explained. As shown by FIGS. 1 and 2, the additional lamp piece unit 60 includes an optical axis Axa extended to an outer side in a vehicle width direction by an angle (for example, about 30°) relative to the front and rear direction of the vehicle slightly downwardly (for example, downwardly by about 0.6°) and is supported by the lamp body 12 inclinably by way of swiveling means 52.

The swiveling means 52 performs a function of swiveling, and has a corresponding structure for performing this function that comprises, but is not limited to, a unit support member 54 for supporting the additional lamp piece unit 60, a bracket 56 fixedly supported by the lamp body 12 in a state of supporting the unit supporting member 54 pivotably in a horizontal face, and a unit driving actuator 58 for pivoting the unit supporting member 54 around a vertical axis line along with the additional lamp piece unit 60. The unit driving actuator 58 comprises a step motor or the like. Further, according to the swiveling means 52, the additional lamp piece unit 60 is inclined in the left and right direction within an angular range (for example, within an angular range of about ±10°, or about 20 degrees total) by driving the unit driving actuator 58 by a control unit 70. The control unit 70 forms that corresponding structure that performs the function of controlling, and can include, for example but not byway of limitation, a processor that generates an output signal in response to a received input signal. The input signal may be generated based on a user command or a driving condition, but is not limited thereto.

The unit supporting member 54 is made by diecasting and is formed with a plurality of cooling fins 54*a* projected to a space of a rear side of the bracket 56 to thereby achieve a function as a heat sink.

Figure 6:
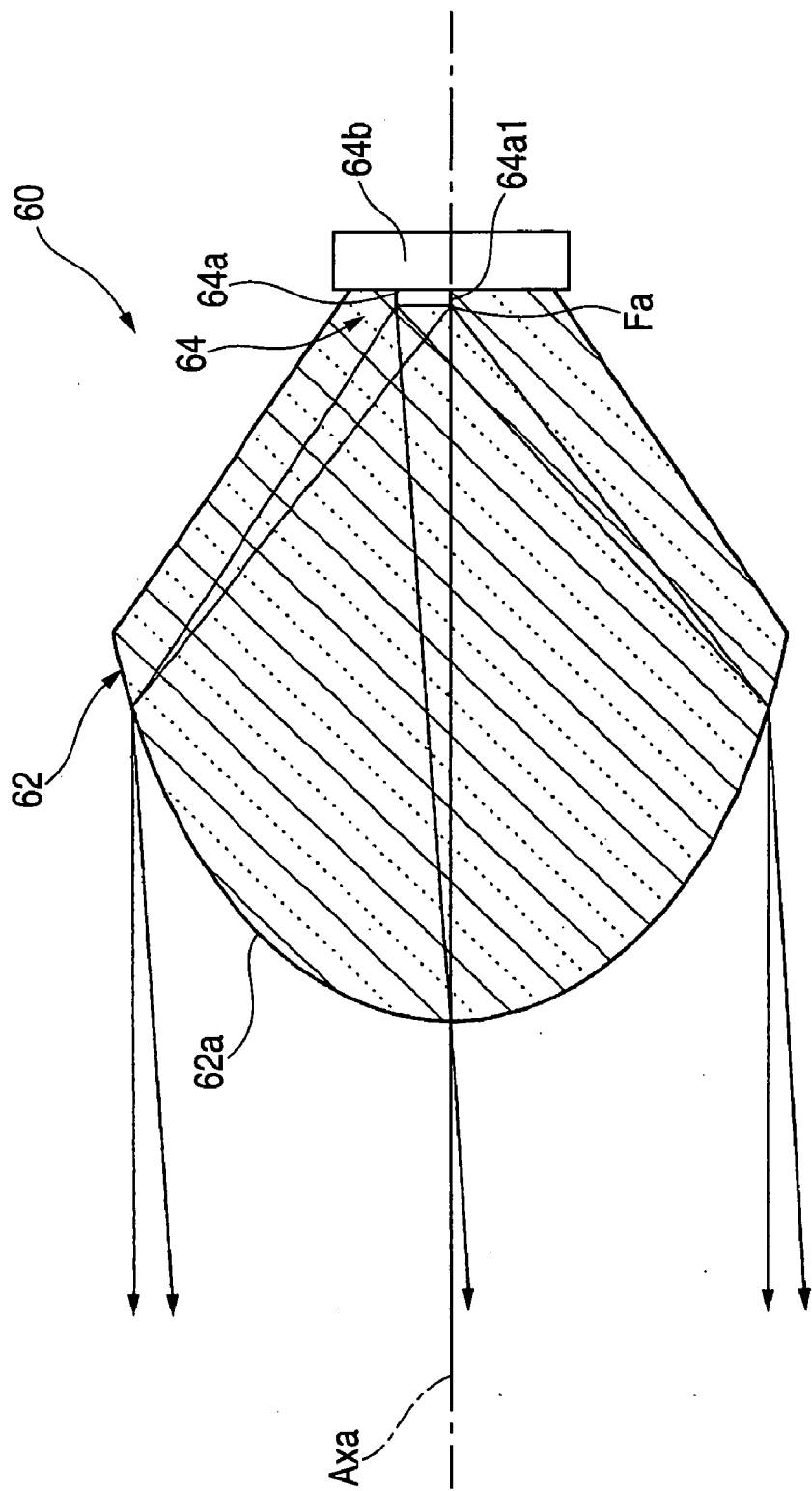
FIG. 6 is a side sectional view showing a single piece of an additional lamp piece unit of the vehicular headlamp according to the exemplary, non-limiting embodiment of the present invention.
Figure 7:
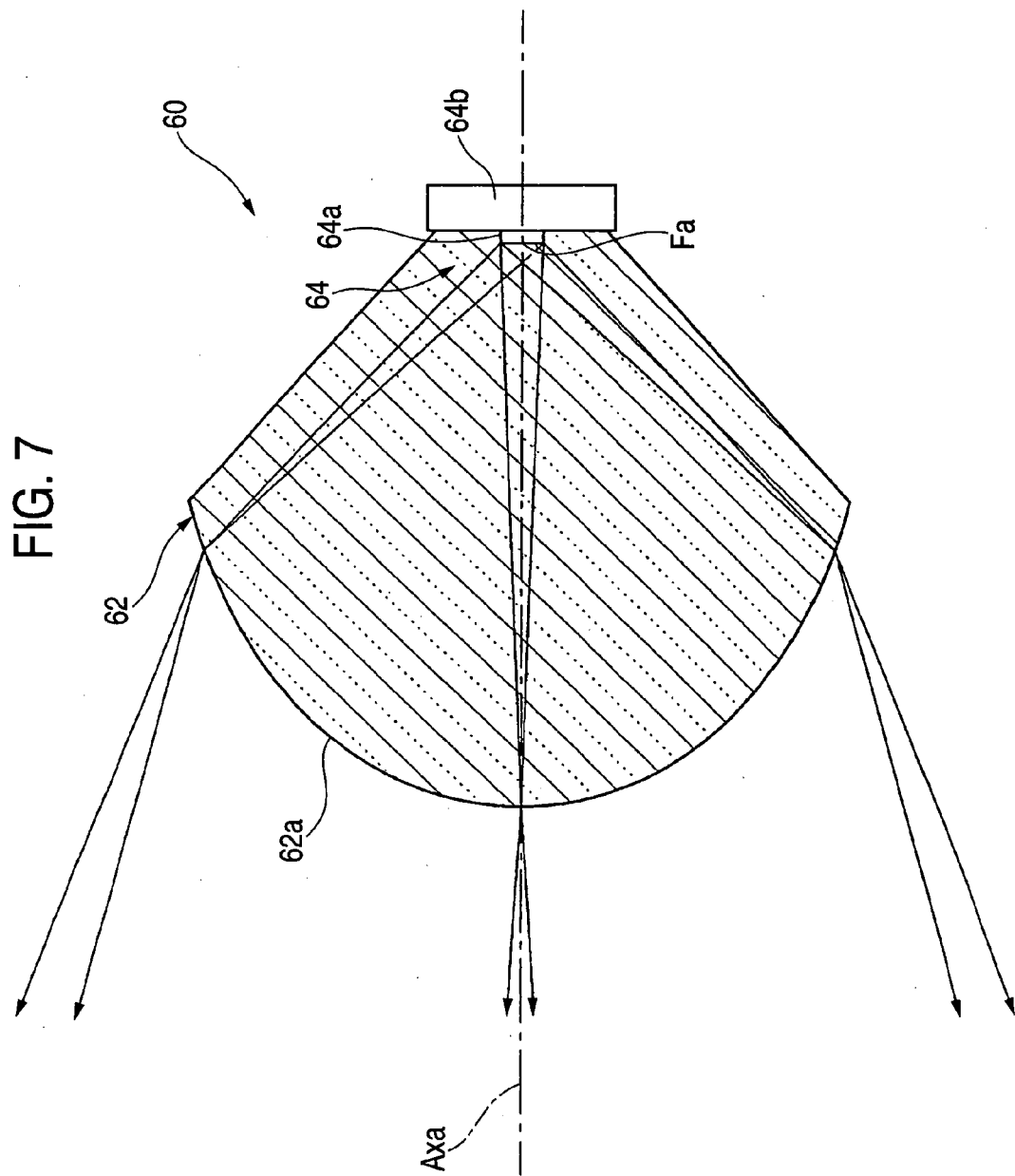
FIG. 7 is a plane sectional view showing the single piece of the additional lamp piece unit according to the exemplary, non-limiting embodiment of the present invention.

FIGS. 6 and 7 are a side sectional view and a plane sectional view showing a single piece of the additional lamp piece unit 60. The additional lamp piece unit 6*b* comprises a projecting lens 62 arranged on the optical axis Axa and a semiconductor light emitting element 64 arranged to direct in the front direction on a rear side of the projecting lens 62.

The semiconductor light emitting element 64 is a white light emitting diode constituted by mounting a light emitting chip 64*a* at a front face of a base plate 64*b* arranged to be orthogonal to the optical axis Axa and is arranged to dispose a center position in the left and right direction of a lower end edge 64*a*1 of the light emitting chip 64*a* on the optical axis Axa.

The projecting lens 62 comprises a molded product made of a transparent resin in which a front side face 62*a* thereof is formed substantially by a shape of an ellipsoid and a rear side surface thereof is formed substantially in a shape of an elliptic cone face, and is fixed to the base plate 64*b* of the semiconductor light emitting element 64 at a rear end portion thereof. In this case, the projecting lens 62 is made to function also as a seal resin for sealing the light emitting chip 64*a* of the semiconductor light emitting element 64.

According to the front side surface 62*a* of the projecting lens 62, a vertical sectional shape thereof including the optical axis Axa is constituted by a curve substantially in a shape of an elliptic arc having a focal point Fa at the center position in the left and right direction of the lower end edge 64*a*1 of the light emitting chip 64*a*. Meanwhile, a horizontal sectional shape of the front side surface 62*a* of the projecting lens 62 including the optical axis Axa is constituted by a curve substantially in a shape of an elliptic arc having a radius of curvature smaller than that of the vertical sectional shape.

Further, whereas the projecting lens 62 emits light from a point on the optical axis Axa at the lower end edge 64*a*1 of the light emitting chip 64*a* as parallel light in a section orthogonal to the lower end edge 64*a*1 of the light emitting chip 64*a*, the projecting lens 62 emits light from a point on the optical axis Axa at the lower end edge 64*a*1 of the light emitting chip 64*a* as diffusing light in a section in parallel with the lower end edge 64*a*1 of the light emitting chip 64*a*.

The additional lamp piece unit 60 is lighted when the vehicle turns in the right direction. The right turn running state is detected based on steering operation, navigation information or the like and the additional lamp piece unit 60 is controlled to light on and off by the control unit 70 based on the detected data.

Figure 8:
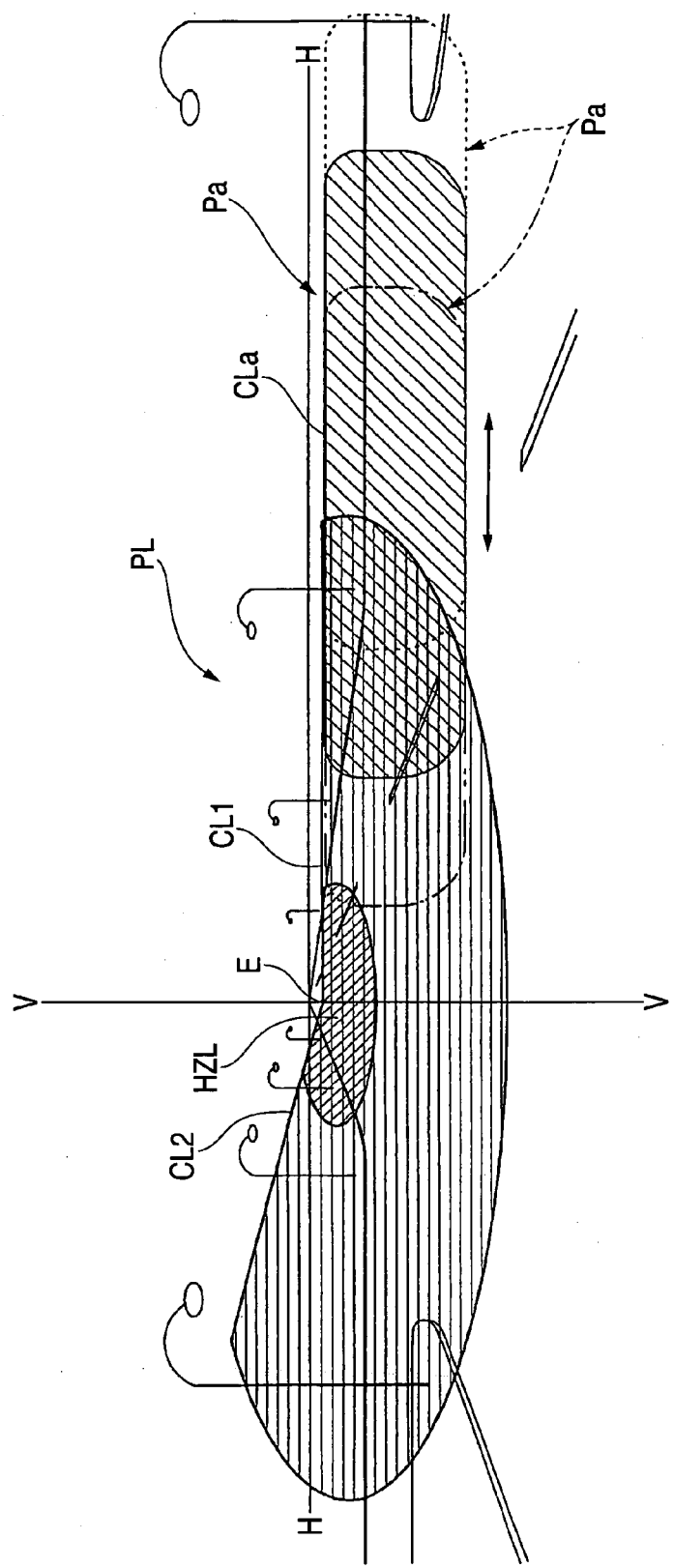
FIG. 8 is a diagram perspectively showing an additional light intensity distribution pattern formed on the imaginary vertical screen by irradiating light from the additional lamp piece unit along with the light intensity distribution pattern for the low beam.

FIG. 8 is a perspective diagram showing an additional light intensity distribution pattern Pa formed on the imaginary vertical screen by irradiating light from the additional lamp piece unit 60 along with the light intensity distribution pattern PL for a low beam.

The additional light intensity distribution pattern Pa is formed as the invertedly projected image of the light emitting chip 64*a* of the semiconductor light emitting element 64 in the additional lamp piece unit 60. The additional light intensity distribution pattern Pa becomes a light intensity distribution pattern prolonged sideways expanded only in the horizontal direction by operation of the projecting lens 62 and an upper end portion thereof is formed with a cutoff line CL a extended in the horizontal direction as the invertedly projected image of the lower end edge 64a1 of the light emitting chip 64a arranged to pass the optical axis Axa.

The additional light intensity distribution pattern Pa becomes a light intensity distribution pattern widened to a right side from a right end side of the light intensity distribution pattern PL for a low beam since the optical axis Axa of the additional lamp piece unit 60 is extended slightly downwardly to direct to the output side in the vehicle width direction by the angle relative to the front and rear direction of the vehicle and the cutoff line CL a is disposed at a height substantially the same as the horizontal cutoff line CL 1 of the light intensity distribution pattern PL for a low beam.

Further, the additional light intensity distribution pattern Pa can move within an angular range from a position indicated by two-dotted chain lines to a position indicated by broken lines of FIG. 8 in accordance with a steering angle or the like of the vehicle by inclining the additional lamp piece unit 60 in the left and right direction by the swiveling means 52.

As described above, the vehicular headlamp 10 according to the exemplary, non-limiting embodiment of the present invention is provided with the basic lamp piece unit 20 able to selectively irradiate light for forming the light intensity distribution pattern PL for a low beam and irradiate light for forming the light intensity distribution pattern PH for a high beam. The additional lamp piece unit 60 for irradiating light for forming the additional light intensity distribution pattern Pa by being irradiated temporarily in lighting the basic lamp piece unit 20, the light source bulb 22 is used as the light source of the basic lamp piece unit 20, the semiconductor light emitting element 64 is used as the light source of the additional lamp piece unit 60. Therefore, at least the following operation and effects can be achieved.

With regard to the basic lamp piece unit 20 which needs a large amount of irradiating light, a necessary number of pieces of the lamp piece units can be minimized. Meanwhile, with regard to the additional lamp piece unit 60 which is lighted on and off repeatedly in accordance with the situation of running the vehicle, by using the semiconductor light emitting element 64 having the fast response speed in being lighted on an off and excellent in durability against repeatedly lighting on and off the semiconductor light emitting element 64 as the light source, light can be irradiated in accordance with a situation of running the vehicle. Further, the life of the light source can sufficiently be ensured. By using the semiconductor light emitting element 64, the additional lamp piece unit 60 can compactly be constituted. Therefore, the additional lamp piece unit 60 can easily be arranged to be able to form the aimed additional light intensity distribution pattern Pa.

In this way, according to the exemplary, non-limiting embodiment of the present invention, light can be irradiated in correspondence with a situation of running the vehicle after promoting the degree of freedom of arranging the additional lamp piece unit 60 and sufficiently ensuring the life of the light source.

According to this embodiment, the discharge bulb in which color temperature of emitted light is substantially proximate to color temperature of light emitted by the semiconductor light emitting element 64 as the light source bulb 22 of the basic lamp piece unit 20. Therefore, pale light irradiated from the additional lamp piece unit 60 can be added to pale light irradiated form the basic lamp piece unit 20. Thereby, a strange visual sensation can be substantially prevented from being given to the driver or the like when the additional lamp piece unit 60 is lighted on and off.

Further, when the basic lamp piece unit 20 and the additional lamp piece unit 60 are substantially simultaneously irradiated, a feeling of unity of color can be achieved between the two lamp piece units 20, 60. Therefore, the outlook of the lamp pieces can be prevented from being deteriorated.

According to the embodiment, the additional lamp piece unit 60 is arranged to direct to the outer side in the vehicle width direction by the angle relative to the front and rear direction of the vehicle. Therefore, the additional light intensity distribution pattern Pa can easily be formed in the side direction of the light intensity distribution pattern PL for a low beam. Further, the additional lamp piece unit 60 is lighted additionally in running the vehicle to turn to the right. Therefore, the front road face in the turning direction can sufficiently be irradiated to promote the recognaizability.

Particularly, according to this embodiment, the additional light intensity distribution pattern Pa includes the cutoff line CL a at the upper end edge. The cutoff line CL a is disposed at the height substantially the same as that of the horizontal cutoff line CL 1 of the light intensity distribution pattern PL for a low beam. Therefore, the front region in the turning direction can be irradiated up to a remote side to further promote the recognaizability without casting glare to the driver in the opposite lane.

Further, this embodiment is provided with the swiveling means 52 for inclining the additional lamp piece unit 60 in the left and right direction in accordance with the situation of running the vehicle. Therefore, in running the vehicle turning right, the front road face in the turning direction can further precisely be irradiated. In this case, the swiveling means 52 that performs the function of swiveling can be constructed by a corresponding structure that includes the unit supporting member 54, the bracket 56 and the unit driving actuator 58, since the additional lamp piece unit 60 is compactly constituted.

Figure 9:
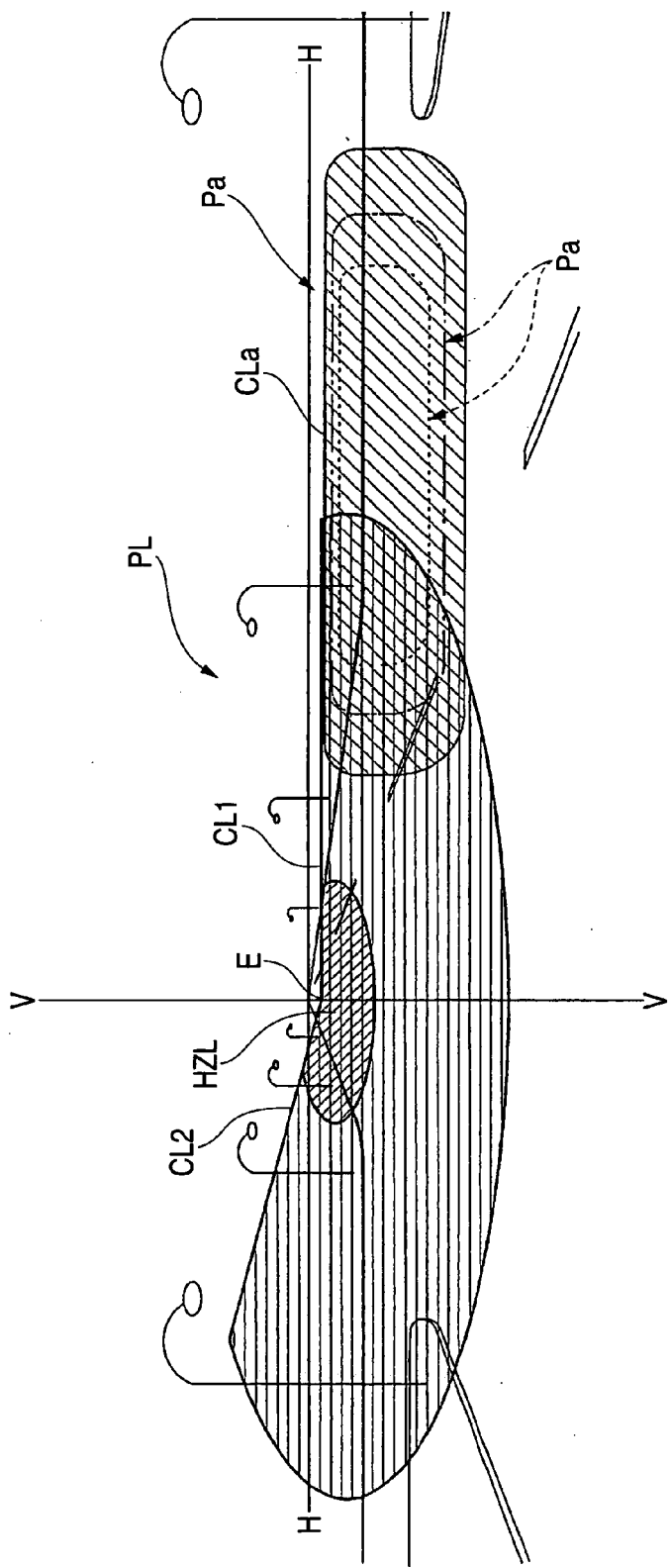
FIG. 9 is a diagram similar to FIG. 8 showing operation of a first modified example of the above-described embodiment of the present invention.

In the vehicular headlamp 10, the control unit 70 for controlling the additional lamp piece unit 60 can be provided with a function as light controlling means for increasing or reducing an amount of irradiating light of the additional lamp piece unit 60 in accordance with a situation of running the vehicle to vary brightness of the additional light intensity distribution pattern Pa, as shown by FIG. 9.

FIG. 9 shows a behavior of gradually changing a size of the additional light intensity distribution pattern Pa by controlling light as shown by two-dotted chain lines and broken lines. By controlling light in this way, light can be further finely irradiated in correspondence with the situation of running the vehicle. In this case, the light controlling function can also be used along with the swiveling function.

Figure 10:
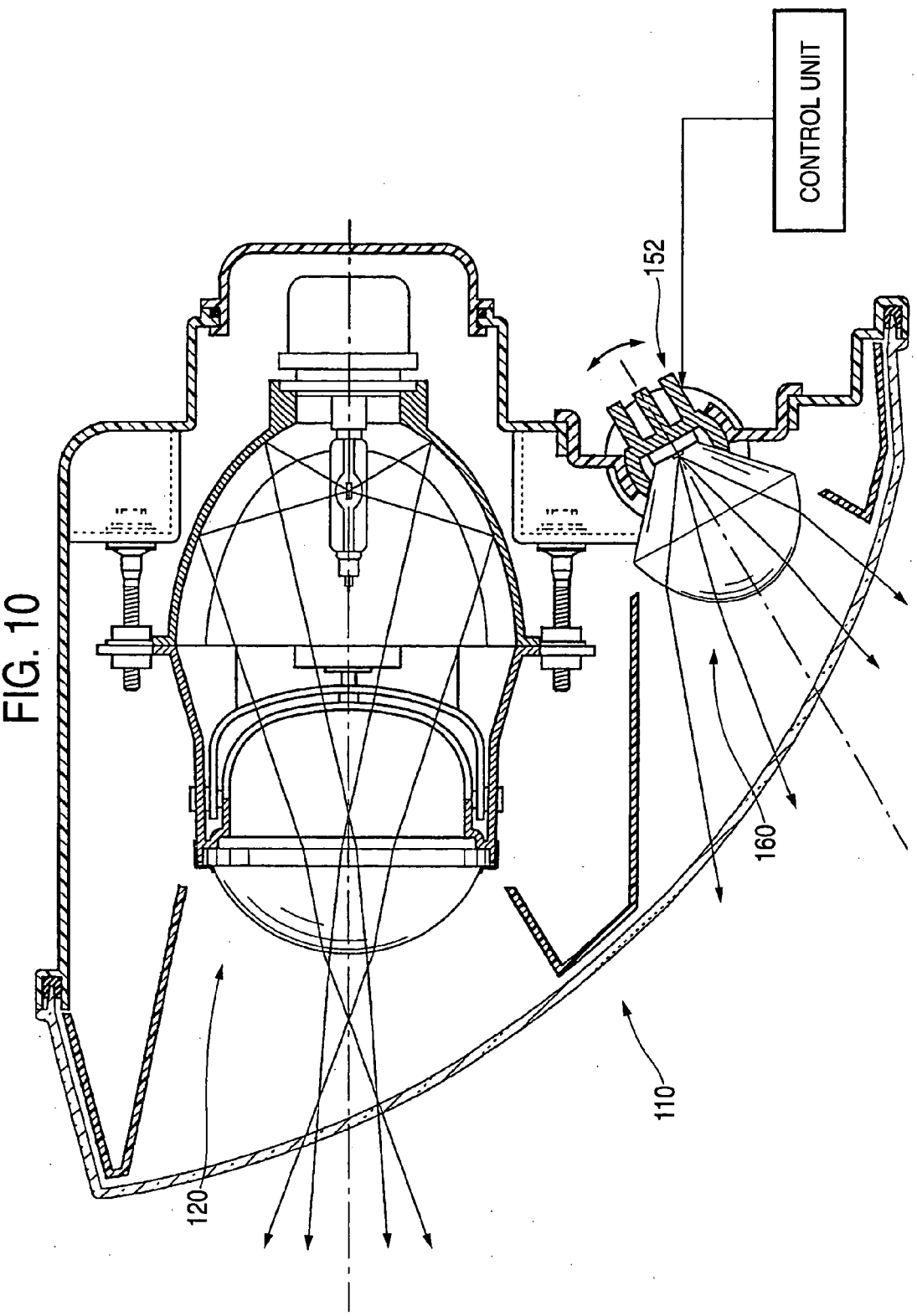
FIG. 10 is a view similar to FIG. 2 showing second modified example of the above-described embodiment of the present invention.

Although an explanation has been given of the vehicular headlamp 10 arranged on the right side of the front end portion of the vehicle, as shown by FIG. 10, when a vehicular headlamp 110 arranged on the left side of the front end portion of the vehicle is constructed by a constitution including a basic lamp piece unit 120 and an additional lamp piece unit 160 similar to the basic lamp piece unit 20 and the additional lamp piece unit 60 of the vehicular head lamp 10, operation and effect similar to those of the above-described embodiment can be achieved.

By arranging the basic lamp piece unit 120 in a positional relationship constituted by parallely moving the basic lamp piece unit 20 and arranging the additional lamp piece unit 160 in a positional relationship constituted by inverting the left side and the right side of the additional lamp piece unit

Figure 11:
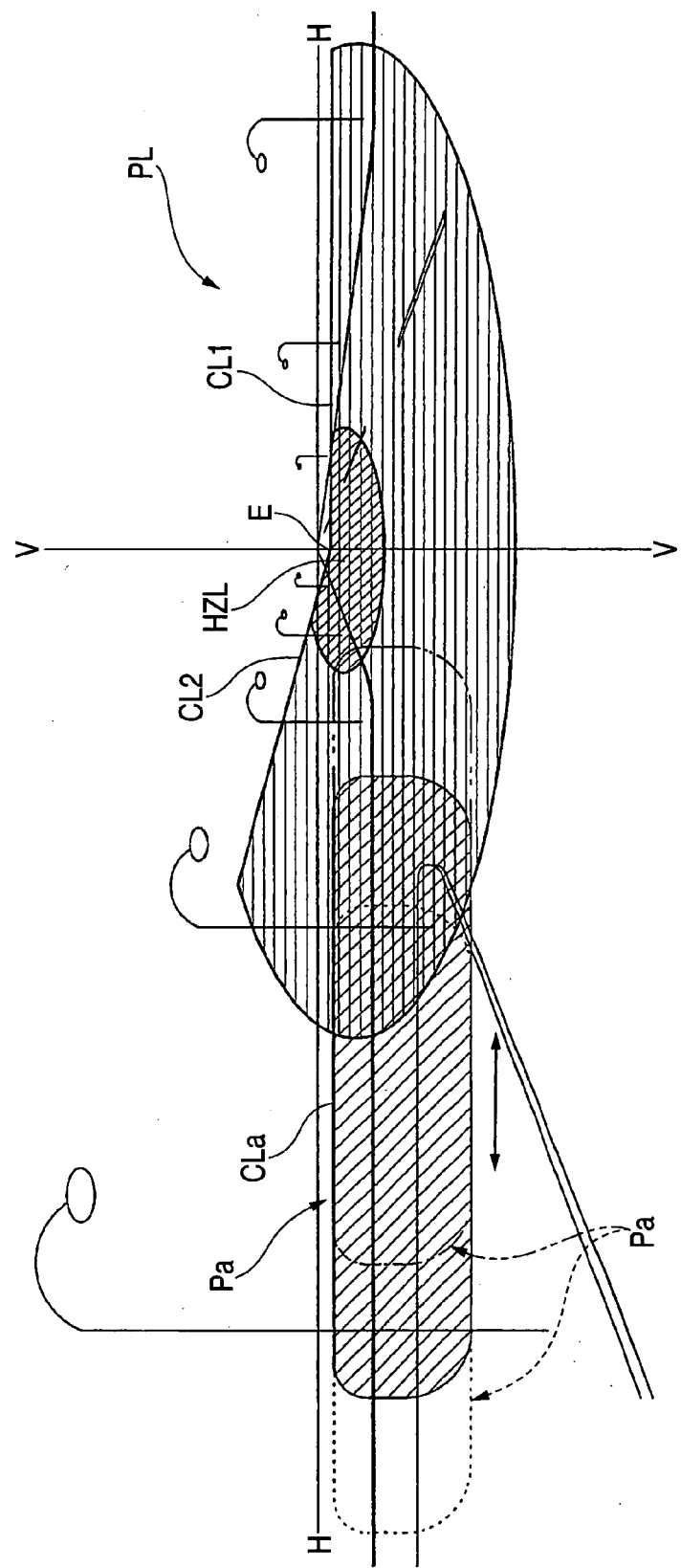
FIG. 11 is a diagram similar to FIG. 8 showing operation of the above-described second modified example of the present invention.

60, as shown by FIG. 11, the light intensity distribution pattern PL for a low beam and the additional light intensity distribution pattern Pa widened to the left side from the left side end portion of the light intensity distribution pattern PL for a low beam can be formed. Further, in running the vehicle to turn to the left, the front road face in the turning direction can sufficiently be irradiated to promote the recognizability.

In this case, by constructing a constitution including swiveling means 152 substantially similar to the swiveling means 52 of the vehicular headlamp 10, the additional light intensity distribution pattern Pa can be moved within an angular range from a position indicated by two-dotted chain lines to a position indicated by broken lines of FIG. 11. Thereby, in running the vehicle to turn to the left, the front road face in the turning direction can further precisely be irradiated.

Further, when a total of the vehicle is constructed by a constitution arranged with the vehicular headlamps 10, 110 on both left and right sides of the front end portion, even in the case of turning the vehicle in either of left and right directions, the front road face in the turning direction can sufficiently be irradiated to promote the recoginizability.

Although according to the above-described embodiment, an explanation has be given such that the additional lamp piece unit 60 is temporarily lighted in a state of lighting the basic lamp piece unit 20 in the low beam mode, a constitution of temporarily lighting the additional lamp piece unit 60 can naturally be constructed also in a state of lighting the basic lamp piece unit 20 in the high beam mode. When constituted in this way, the additional light intensity distribution pattern Pa is formed in the side direction of the light intensity distribution pattern PH for a high beam and therefore, the front recognizability can considerably be promoted in running on a curved road or the like at a mountain portion.

Further, although an explanation has been given such that the additional lamp piece unit 60 is lighted in running the vehicle to turn, the additional lamp piece unit 60 can be constituted to temporarily light under the other situation of running the vehicle. For example but not by way of limitation, when the additional lamp piece unit 60 is constituted to be lighted when rainfall is detected by a rainfall sensor, the recognizability can be promoted in running under rainy weather by irradiating a lane mark or a road shoulder extended along a running lane even under a situation in which the road in front of the vehicle is wet and is very difficult to see.

Although an explanation has been given of the case of providing the single lamp piece unit as the additional lamp piece unit 60, a plurality of lamp piece units may be constituted to provide as the additional lamp piece units 60.

Further, although the additional lamp piece unit 60 is constituted as the lamp piece unit of a direct projecting type for projecting the image of the semiconductor light emitting element 64 directly in the front direction by the projecting lens 62, the additional lamp piece unit 60 can also be constituted as a lamp piece unit of a projector type for projecting light from the semiconductor light emitting element by a projecting lens after temporarily concentratedly reflecting the light by a reflector, or a lamp piece unit of a parabola type for reflecting light from the semiconductor light emitting element in the front direction by a reflector or the like.

Further, although according to the above-described embodiment, an explanation has been given such that the light intensity distribution pattern PL for a low beam formed by light irradiated from the basic lamp piece unit 20 includes the horizontal and the skewed cutoff lines CL 1, CL 2 at the upper end edge, the light intensity distribution pattern PL for a low beam may naturally includes the other cutoff line (for example but not by way of limitation, a cutoff line formed with a pair of left and right horizontal cutoff lines with a stepped difference and in steps).

Although according to the above-described embodiment, the basic lamp piece unit 20 is constituted as the lamp piece unit of the projected type capable of switching the beam to the low beam and the high beam, the basic lamp piece unit 20 can also be constituted as a lamp piece unit exclusively for the low beam, further, can be constituted as a lamp piece unit of other than the projector type (for example, a lamp piece unit of a parabola type or the like).

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

The invention claimed is:

1. A vehicular headlamp having a main lamp body, comprising:
    a basic lamp piece unit configured to irradiate light to form a light intensity distribution pattern for a low beam;
    an additional lamp piece unit configured to irradiate light to form an additional light intensity distribution pattern by being lighted temporarily in the main lamp body,
    wherein a light source bulb is used as a light source of the basic lamp piece unit and a semiconductor light emitting element is used as a light source of the additional lamp piece unit;
    and further comprising a controller which controls an amount of irradiating light of the additional lamp piece unit in accordance with a situation of running the vehicle; and
    wherein the controller controls the additional lamp unit to irradiate light during only a portion of the time when the basic lamp piece unit irradiates light.

2. The vehicular headlamp according to claim 1, wherein the light source bulb comprises a discharge bulb.

3. The vehicular headlamp according to claim 1, wherein the additional lamp piece unit is directed to an outer side in a vehicle width direction by an angle relative to a rear to front direction of a vehicle.

4. The vehicular headlamp according to claim 1, further comprising:
    means for swiveling the additional lamp piece unit in accordance with the situation of running the vehicle.

5. A vehicular headlamp, comprising:
    a first lamp unit; and
    a second lamp unit, wherein said first lamp unit and said second lamp unit are formed inside a chamber having a cover configured to transmit light having a substantially similar color;
    wherein a semiconductor light emitting element is used as a light source for the second lamp unit;
    wherein a light source other than a semiconductor light emitting element is used for the first lamp unit;
    wherein the color of the light of the first lamp unit is substantially similar to an emission color of the light source of the second lamp unit;
    wherein said first lamp unit comprises an aiming mechanism that aims said first lamp unit at least one of up, down, left and right with respect to an optical axis; and wherein said first lamp unit is aimed about 0.5 to 0.6 degrees below said optical axis.

6. The vehicular headlamp of claim 5, wherein said first lamp unit is configured to switch between a low beam position and a high beam position, and said second lamp unit is configured to form a light intensity distribution pattern.

7. The vehicular headlamp of claim 5, wherein said first lamp unit is of a projector type and comprises a light source bulb that discharges light, a reflector that reflects said discharged light in a direction proximate to said optical axis, wherein said reflector is supported by a holder.

8. The vehicular headlamp of claim 5, said first light unit further comprising a movable shade having a light blocking position and a light blocking release position, and a fixed shade that fixes said movable shade in one of said light blocking position and said light blocking release position.

9. The vehicular headlamp of claim 8, wherein said movable shade is connected to an output shaft that is turned by an actuator to move said movable shade.

10. The vehicular headlamp of claim 5, wherein said second lamp unit has an optical axis that extends at an angle with respect to a rear to front direction of a vehicle of said vehicular headlamp, and includes a swiveling device that pivots said second lamp unit in a left-right direction with an angular range.

11. The vehicular headlamp of claim 10, wherein said swiveling device is controlled by a control unit coupled thereto, and said swiveling device comprises an actuator that drives a pivoting support member in accordance with a signal received from said control unit.

12. The vehicular headlamp of claim 11, wherein said control unit controls a brightness of said second lamp unit.

13. The vehicular headlamp of claim 10, wherein the semiconductor light emitting element is mounted on said swiveling device.

14. A vehicular headlamp, comprising:

a first lamp unit; and a second lamp unit, wherein said first lamp unit and said second lamp unit are formed inside a chamber having a cover configured to transmit light having a substantially similar color;

wherein a semiconductor light emitting element is used as a light source for the second lamp unit;

wherein a light source other than a semiconductor light emitting element is used for the first lamp unit;

wherein the color of the light of the first lamp unit is substantially similar to an emission color of the light source of the second lamp unit;

wherein said second lamp unit has an optical axis that extends at an angle with respect to a rear to front direction of a vehicle of said vehicular headlamp, and includes a swiveling device that pivots said second lamp unit in a left-right direction with an angular range; and wherein said angle is about 30 degrees, and said angular range is about 20 degrees.

* * * * *